J. M. ROHLFING.
UNDERFRAME AND TRUCK ASSEMBLY.
APPLICATION FILED DEC. 4, 1915.

1,370,766.  Patented Mar. 8, 1921.
5 SHEETS—SHEET 3.

Inventor
John M. Rohlfing
by J. H. Gibbs
Atty.

J. M. ROHLFING.
UNDERFRAME AND TRUCK ASSEMBLY.
APPLICATION FILED DEC. 4, 1915.

1,370,766.

Patented Mar. 8, 1921.
5 SHEETS—SHEET 4.

INVENTOR.
JOHN M. ROHLFING
BY J. H. Gibbs
ATTORNEY.

J. M. ROHLFING.
UNDERFRAME AND TRUCK ASSEMBLY.
APPLICATION FILED DEC. 4, 1915.

1,370,766.

Patented Mar. 8, 1921.
5 SHEETS—SHEET 5.

INVENTOR.
JOHN M. ROHLFING
BY J. H. Gibbs
ATTORNEY.

UNITED STATES PATENT OFFICE.

JOHN M. ROHLFING, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

UNDERFRAME AND TRUCK ASSEMBLY.

1,370,766.  Specification of Letters Patent.  Patented Mar. 8, 1921.

Application filed December 4, 1915. Serial No. 65,039.

*To all whom it may concern:*

Be it known that I, JOHN M. ROHLFING, residing at St. Louis, Missouri, and being a citizen of the United States, have invented certain new and useful Improvements in Underframe and Truck Assemblies, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In railroad freight traffic there are types of lading which can only be suitably transported in cars having unusually heavy construction, and it is a purpose of the present invention to provide construction giving to the car, in which it is embodied, large carrying strength.

In cars having such heavy construction, the center sills necessarily have a considerable depth and heretofore it has been common to reduce the end portions of such center sills so as to produce what is known as fish-belly sills. It is a purpose of this invention to permit the use of sills having the requisite depth for the necessary strength which depth may be uniformly maintained throughout the length of the sills even when they pass beyond the bolsters and toward or to the car end sills. Not only may this uniformity of the sills be maintained, but exceptional depth may be given to them inasmuch as it is only necessary to preserve a sufficient amount of clearance beneath them and above the axles, and as the remaining dimensions of the sills will be proportionate to the depth, great strength may be present in such sills.

A decided advantage is obtained by preserving the uniformity of depth in the center sills, due to the fact that the center line of any buffing shock transmitted through the draft gear will continue approximately along the single center of gravity of the sill from end to end thereof, and not as in the case of fish-belly sills, through one center of gravity at the bolsters and through another at the center of a car, as is common in ordinary car construction of center sills having reduced ends. The latter form of sill acquires additional stress under buffing influences, due to the eccentricity or altitude differences in the locations of the plural centers of gravity.

Improved means for supporting a car body are provided, giving greater stability thereto without the loss of resiliency from the truck springs, and, on account of the car body bearing at all times on points approximating the usual locations of the side bearings of a car, there will not be the additional shock at this point which would be present in the usual construction where there is side bearing clearance. The reason for this is that in the older form employing the side bearings, the car body tilts in an unresisted manner for an amount equal to the side bearing clearance, which means that the final blow at this point is increased, and should it occur at a critical moment in rounding a curve, a derailment is liable to take place.

Additional advantage is obtained through having the center sills pass over the axles with only a very small clearance, in that, in case of any part of the truck axles or side frames failing, the car with the balance of the truck is prevented from falling any great distance, and so as to cause an immediate wreck, for the center sills would rest on the remaining axles and the pivot or bolster swing arms would support the broken side frame. Also, the truck, being locked to the body of the car, will, in case the car tips over, not be dropped from said car-body, as trucks in ordinary construction would be dropped.

On account of the relatively high position of the spring plank, ample room is provided in which to apply diagonal or other braces at lower points to the truck side frames to assist in holding the truck square, and the unusual height of the spring plank provides more than the usual space above a roadbed so that there is no possible interference with a load which has been dumped by a ballast car between the tracks and such roadbed.

Various other advantages and a considerable amount of novel construction will appear hereinafter, and all parts of the present invention.

Figures 1, 9, 10:
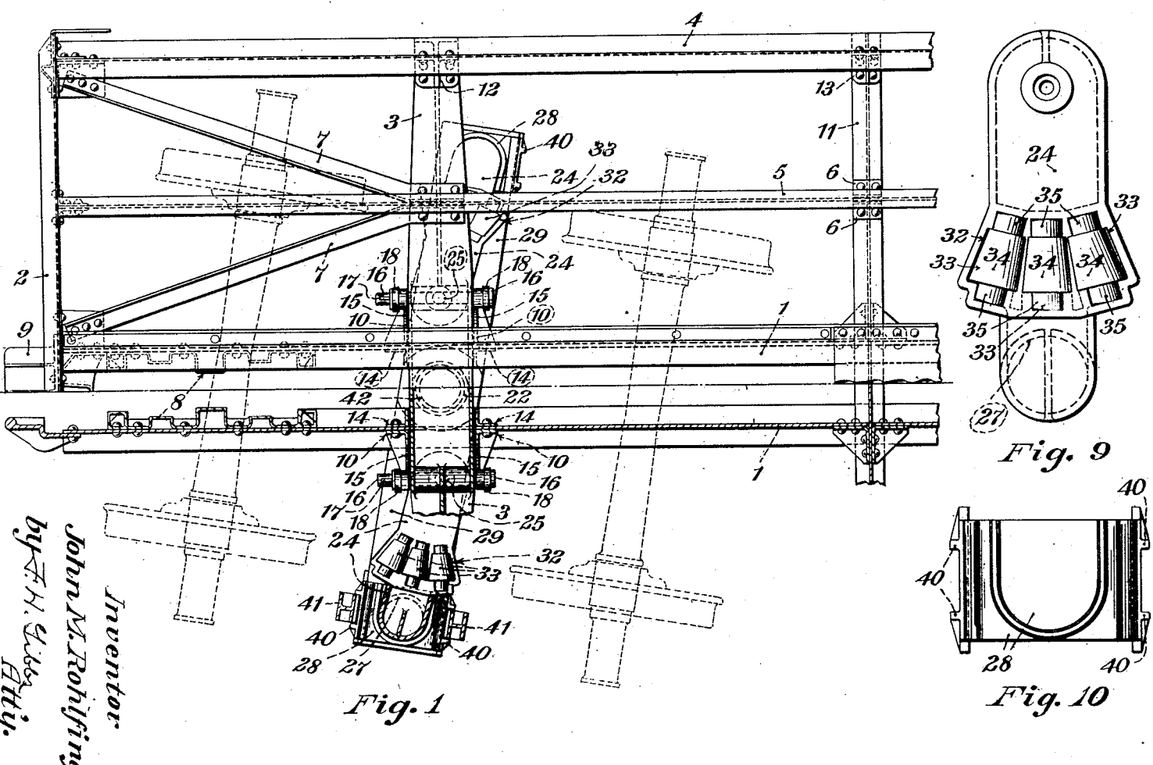
Figure 1 is a plan and partial horizontal section of approximately one transverse half of a portion of the underframe and shows the truck in a position assumed in rounding a curve.
Fig. 9 is a plan view of a supporting arm showing the supporting rollers in position.
Fig. 10 is a plan view of the spring plank guide and supporting arm seat.
Figure 2:
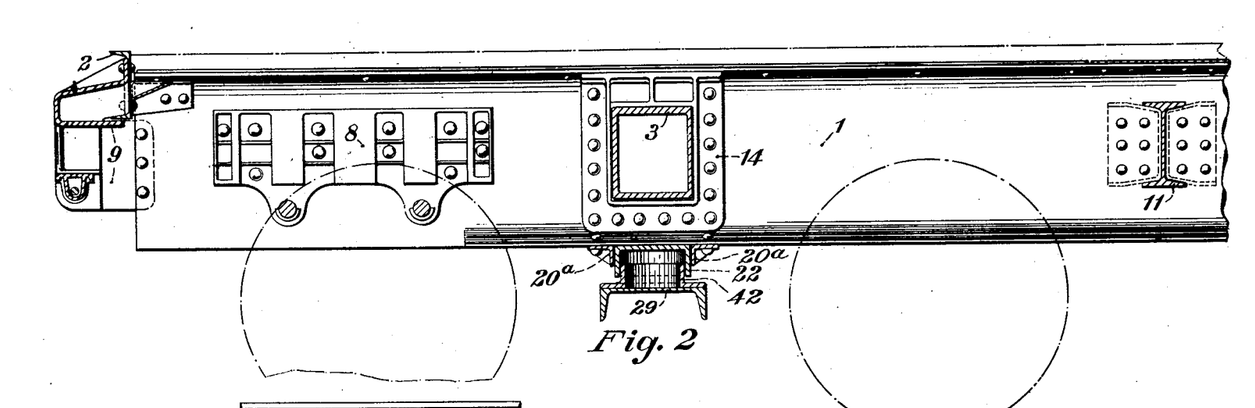
Fig. 2 is a longitudinal section thereof taken on line 2—2 of Fig. 6.
Figure 3:
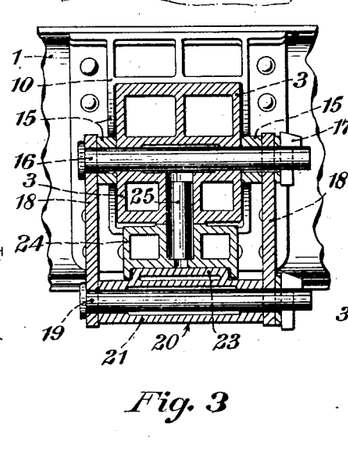
Fig. 3 is a vertical section taken through the body bolster on line 3—3 of Fig. 6.

Referring to the drawings, and particularly to Fig. 1, 1 indicates the center sills of the car underframe in the form of commercially rolled I-beams suitably spaced apart, and which extend to the car end sills 2, shown in Fig. 2 to be channels. Spaced inwardly from the end sill 2 is a body bolster 3 later referred to more in detail, it being understood that both ends of the underframe are similar and between the bolsters are cross-bearers 11. Side sills 4, which may be Z bars, connect the end sills, and intermediate sills 5 run longitudinally of the car and are positioned between the center sills and the side sills.

Intermediate sills 5 are shown to be T's running preferably the entire distance between the end sills 2 and are connected to the cross-bearers 11 by short connection angles 6, and at the bolsters by other angles 7 which in progressing toward the end sill diverge to be joined to the connections between the end and side sills and the end and center sills forming strong braces for the end of the car. Draft gear plates 8 are secured to the inner surface of the webs of the center sills at their end portions, to receive and coöperate with draft gears (not shown) and a striking plate 9 is secured to and extends outwardly from the end sill and the terminals of the center sills.

The body bolster 3 passes through apertures in the webs of the center sills 1, having a box-like formation in its central portion, but acquiring a substantial I-shaped cross section as it extends toward the side sills 4, as clearly shown in Figs. 1 to 4 inclusive, the cross section of the I-shaped portion diminishing as the body bolster continues outwardly.

The outer ends of the body bolster 3 are secured to the bottom flanges of the Z side sills by rivets, and the connection between the body bolster and the side sills is made strong by the use of connection castings 12 conformed to the under and inner sides of side sills 4 and the top of the bolster 3, suitable rivet connection between the connection castings 12 and the side sills and body bolster being made.

Cross-bearers 11 are also connected with the side sills 4 with similar but somewhat narrower connection castings 13. The borders of the apertures in the webs of the center sills 1, through which apertures the body bolsters 3 extend, are reinforced on opposite sides of said web by a pivot casting 10 and a reinforcement casting 14, the former being conformed to the outer face of the web of the center sills 1 and the underside of the top flange thereof. Both these castings 10 and 14 are connected to the web of the center sill by rivets and the pivot casting is provided with bracket arms 15, which extend outwardly toward the side of the car for a short distance. A hanger pin 16 is connected with said bracket arms 15 and bolster 3, the pin passing through the webs of said bolster and thereby securing the casting 10 and center sill 1 in position on the bolster, said pin being provided at one end with a head and being adapted to receive a key 17 at its other end, to retain it in place.

Hung from hanger pin 16 are swing links 18, the lower ends of which extend below the bottom plane of the center sills 1, and support another pin 19 mounted upon which is a center-driving plate 20. At its opposite ends center-driving plate 20 is provided with integral sleeves 21, through which pins 19 supported from the links 18 on each side of the center sills pass. In its central portion the center-driving plate is provided with a cylindrically shaped socket 22 which is also centrally located between the center sills and the purpose of which will be later made clear.

Integrally connected with the sleeves 21 of the center-driving plate 20 and positioned above such sleeves are seats 23 adapted to support the inner end of hinged supporting arms 24, which are adapted to turn on said seat as the truck encounters a curve.

To prevent excessive swinging of the center-driving plate 20 and also to act as pivots for the inner ends of the supporting arms 24, pivot pins 25 are seated in sockets in said supporting arms and extend upwardly into other sockets in the body bolster 3. The outer ends of supporting arms 24 extend through the side frames 26 of the truck and at said outer ends are provided with a swivel bearing 27 seated in a swivel bearing socket plate 28. The latter rests upon the web of the spring plank 29 and is provided with teats 30 which project into said web, positioning the swivel bearing socket plate 28. The end portions of spring plank 29 which lie under swivel bearing socket plate 28 also rest upon the top of springs 30ª mounted upon sill 31 of the truck side frames 26, resiliently sustaining the supporting arms 24. The supporting arms 24 are provided with car body supports mounted in sockets 32 and comprise a plurality of anti-friction devices 33 arranged in fan-like formation in plan view, as shown in Fig. 9.

Each of the anti-friction devices comprehends a frusto-conical roller 34 and smaller cylindrical rollers 35 at opposite ends thereof, all of the rollers being commonly mounted upon a pin 36, and the smaller rollers 35 bearing against seats in socket 32, the frusto-conical roller 34 being freely revoluble. As there are a pair of hinged supporting arms 24 at each bolster, each containing one of the anti-friction car supports, it is evident that the car body is provided with four points of support. These points of support are intermediate the center and side sills in positions substantially corresponding to those usually occupied by car side bearings. Resting directly upon the frusto-conical rollers of each anti-friction car body support, is a bearing 37 having a convex upper surface seated in a concave socket in the underside of the body bolster 3 as shown in Fig. 6.

Figure 4:
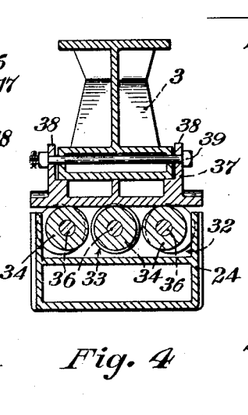
Fig. 4 is a vertical section through one of the supports carried by one of the supporting arms being taken on line 4—4 of Fig. 6.
Figure 5:
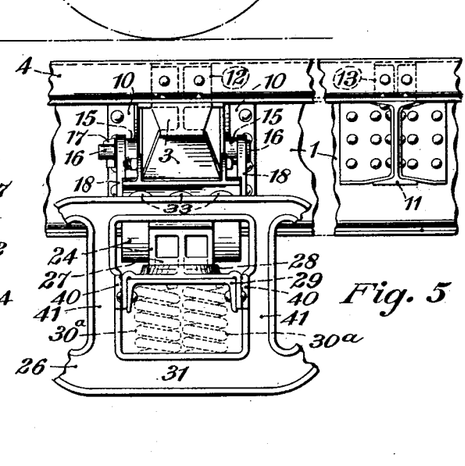
Fig. 5 is a fragmentary side elevational view showing the bolster in normal position and one of the supporting arms assembled with the side frame of a truck.

Referring to Fig. 4, the said bearing 37 will be seen to have a width corresponding substantially to the width of the hinged supporting arms 24 and to have side walls 38 which are internally shouldered to receive the underside of body bolster 3. When the latter is in place, a bolt 39 passes through the side walls 38 of bearing 37 and also through an apertured bottom portion of the body bolster 3 securely connecting the bearing member 37 to the bottom of the body bolster.

Figure 6:
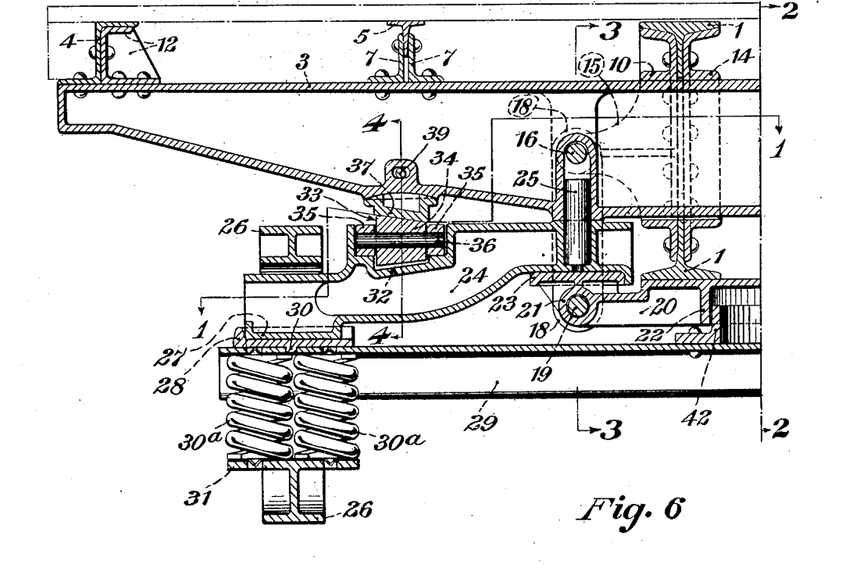
Fig. 6 is a vertical transverse section taken longitudinally through the supporting arm and its associated parts.
Figures 7, 8:
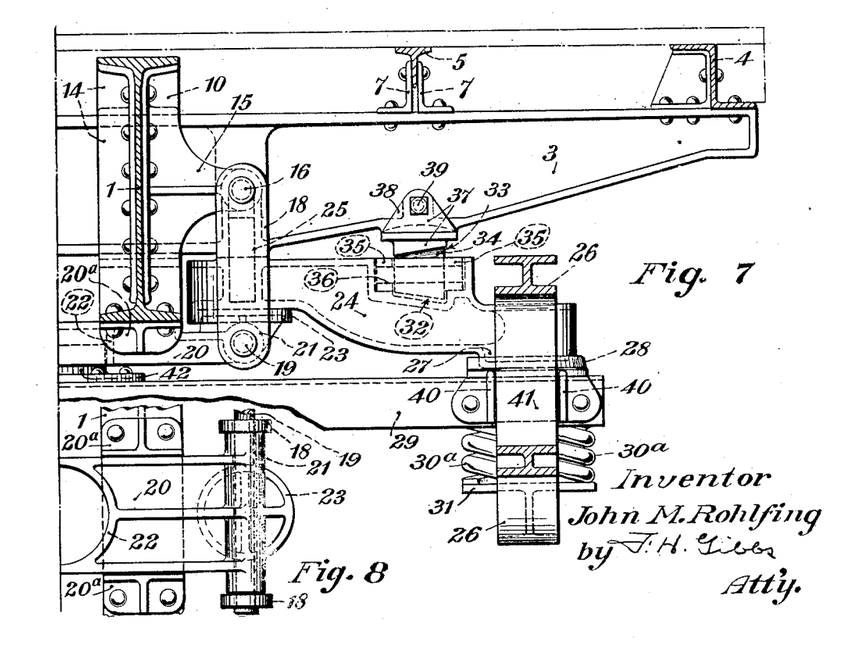
Fig. 7 is a side elevational view of the supporting arm and related parts.
Fig. 8 is an inverted plan view of the link mechanism that connects the bolster and center driving plate with the spring plank and supporting arm removed.

As may be noted in Fig. 6, the aperture for the bolt 39 is of sufficient width to allow such rocking movement of bearing member 37 as is necessary to adjust it to the friction rollers 35 of the car support.

The before-referred-to spring plank 29 is shown as being a commercially rolled channel having its web uppermost and its side flanges depending and with its ends projecting through a central opening in the truck side frame 26. As disclosed in Figs. 5, 6, 7 and 10, the swivel bearing socket plate 28 rests upon the upper surface of the web of the spring plank 29 and has portions extending down over the vertical faces of the flanges thereof, which downturned portions are formed to constitute guides 40 adapted to embrace the guide columns 41 of the truck side frame 26. Said central opening through which the spring plank extends is enlarged in its upper portion to permit the insertion of the ends of the spring plank and the guides 40 and when the spring plank is lowered to its normal position, guides 40 embrace each side of said guide columns 41.

At the center of the spring plank 29 is what I have termed a center-driven plate 42 which is preferably cylindrical and telescopes within cylindrical socket 22 of what is herein referred to as the center-driving plate 20; the latter is sustained from swing links 18 in such manner that cylindrical socket 20 does not bear upon the center-driven plate 42, but merely has swiveling and driving engagement therewith. The cylindrical socket 22 of the center-driving plate 20 and the cylindrical portion of the center-driven plate 42 have a common axis which is also the axis of oscillation of the truck, in this respect being somewhat analogous to the usual center bearing plates of a car. The usual truck bolster however is not present and the truck is drawn along by the telescopic connection between the socket cylinder 22 of the center-driving plate 20 and the cylindrical portion of center-driven plate 42 which is mounted upon the spring plank 29. Thus, when center sills 1 are under the influence of draft stresses, as when the car is in transit, the center-driving plate 20 drives the center-driven plate 42, and hence the truck that carries plate 42. Abutment castings 20ª, secured to the bottom flanges of center sills 1, position center-driving plate 20 and establish a rigid draft connection between the underframe and said driving plate.

As the radius between the pivot pin 25 and the center of the swivel bearing 27 is less than the radius between the center of center-driven plate 42 and the center of swivel bearing socket plate 28, the swivel bearing 27 at the outer end of hinged supporting arms 24 is adapted to slide in said swivel bearing plate a compensating amount.

Figure 11:
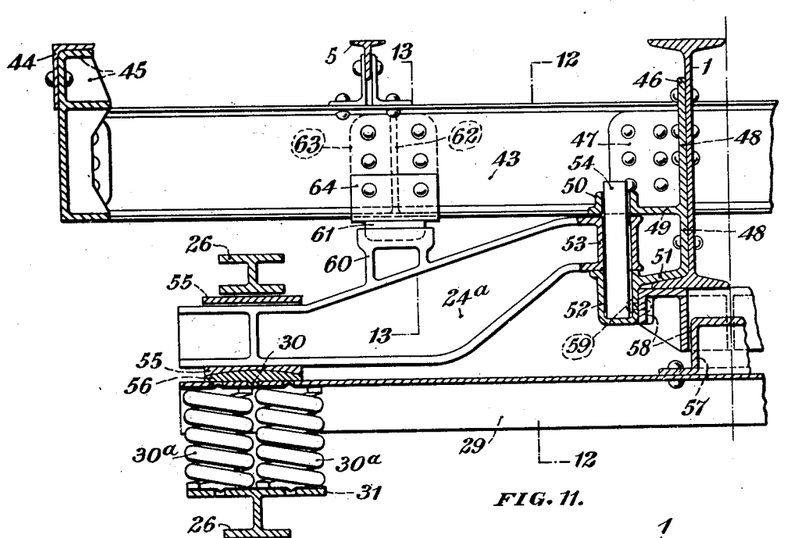
Fig. 11 is a transverse vertical section taken longitudinally of the spring plank and supporting arm of a modified form of construction.
Figure 12:
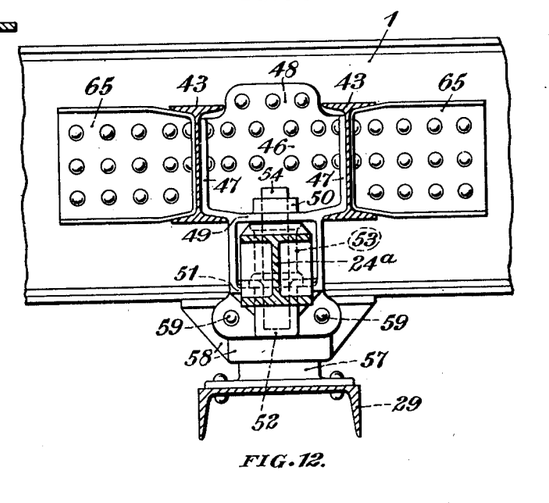
Fig. 12 is a vertical section taken on line 12—12 of Fig. 11.
Figure 13:
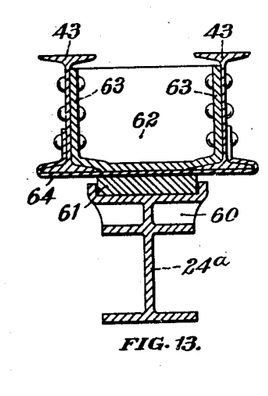
Fig. 13 is another vertical section taken on line 13—13 of Fig. 11, and shows a modified form of support.

In Figs. 11, 12 and 13, a modified form of underframe and truck assembly is shown wherein the body bolster comprises a pair of spaced I-beams which pass through the center sills 1 and are connected to the side sill of angle cross section 44 by castings 45. At each bolster a pivot casting 46 is secured to the outer face of the web of each center sill 1, and serves as a connection between said body bolster I-beams 43 and the center sills 1. The webs of the body bolster I-beams 43 are also connected to the center sills 1 by pressings 65 having web portions riveted to the webs of said center sills and being conformed to the outer faces and inclined portions of the top and bottom flanges of beams 43 to which I-beams they are also riveted. The said pivot casting has flanges 47 riveted to the body bolster 43 and a web portion 48 riveted to the center-sill 1. With its underside substantially coincident with the underside of the body bolster I-beams 43 is a web 49 terminating in a bearing 50, and extending in the same direction from the bottom of vertical web 48 is another outwardly extending web 51 terminating in an open socket 52. Hinged supporting arm 24ª is provided at its inner end with an integral sleeve 53 and a pin 54 extends through the upper bearing 50, sleeve 53 of the supporting arm 24ª and down into socket 52 in the lower portion of the pivot casting, resting upon the bottom wall of said socket and forming the hinge for supporting arm 24ª. As before, each supporting arm 24ª extends to and through an opening in the truck side frame 26; said outer end of supporting arm 24ª also extends through an outer swivel casting 55 and is freely slidable therethrough. The underside of swivel casting 55 is concaved to form a socket into which projects the upper convex face of a swivel bearing casting 56. The latter is mounted upon the horizontally disposed web of the channel-shaped spring plank 29 having teats 30 extending into apertures in said web. As in the previously described form, spring plank 29 is supported upon springs 30ª seated upon the sill 31 of the truck side frame 26.

At the center of the spring plank 29 is located a center-driven plate 57 somewhat similar to center-driven plate 42 except that it has a closed upper surface. Telescoping over center-driven plate 57 is a center-driving plate 58 which lies against the underside of center sills 1 and is secured by rivets 59 to the lower portion of the pivot casting 70 adjacent and on opposite sides of the socket 52 thereof. Center-driving plate 58 does not bear upon the center-driven plate 57 but has swiveling relation therewith, the centers of each of these plates being the center about which the truck as a whole swivels.

Intermediate the ends of each hinged supporting arm 24ª is a car body support which comprises an upward extension 60, provided in its upper surface with a socket, in which rests a bearing block 61 and an upper bearing member attached to the body bolster I-beams 43. This upper bearing member comprises a spacer 62 extending between the body bolster I-beams 43, and having flanges 63 riveted to the inner faces of the webs of I-beams 43, and a bearing plate 64 having end portions conformed to the lower parts of the outer surface of I-beams 43, and the upper and bottom surfaces of the bottom flanges of said I-beams and contacting with the underside of spacer 62, said bearing plate 64 resting directly upon bearing block 61.

As in the preferred form, the car body supports just described occupy positions substantially coincident with those usual for the location of car side bearings.

Figure 14:
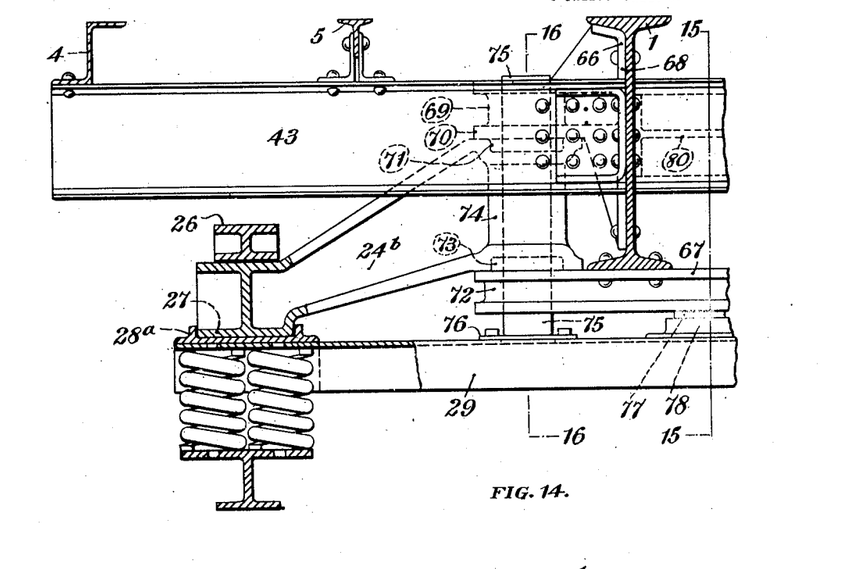
Fig. 14 is a side elevational and part sectional view of the bolster supported at the inner ends of the supporting arms.
Figure 15:
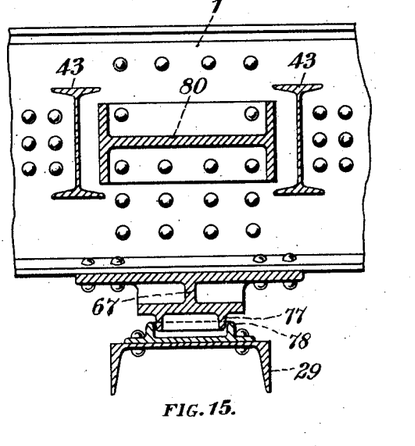
Fig. 15 is a vertical section through one of the supporting arm-engaging castings and the spring plank being taken on line 15—15 of Fig. 14.
Figure 16:
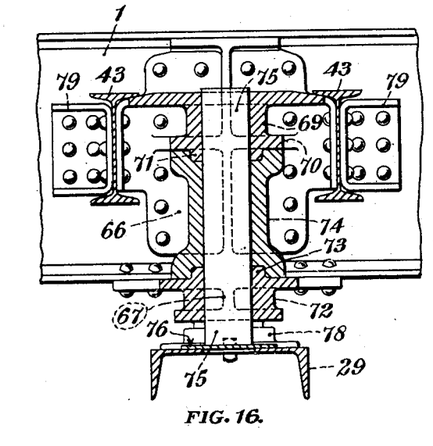
Fig. 16 is a vertical section through the supporting arm and upper and lower supporting brackets being taken on line 16—16 of Fig. 14.

Another modification of the invention is illustrated in Figs. 14, 15 and 16, the body bolster connection comprising spaced I-beams 43, the principal difference being that the car body is supported from the inner ends of the hinged supporting arms 24ᵇ instead of upon supports for the car body located intermediate the ends of said arms.

The pivoting means for each supporting arm 24ᵇ in this instance comprises an upper casting 66 secured to the outer face of center sill 1, and a lower casting 67 attached to and connecting the bottom flanges of the I-beams constituting the center sills. From the base plate 68 of the upper pivot casting a web extends outwardly terminating in a bearing 69, said web being suitably reinforced by a rib 70 on opposite sides thereof and running around the bottom of bearing 69 which has a depending annular projection 71. The bottom pivot member 67 extends outside of the center sill 1 and is provided with a bearing 72 which is substantially equivalent to bearing 69 and is provided with an upper annular projection 73. Before lower pivot member 67 is secured in place centrally perforated sleeve 74 is fitted to surround the lower annular projection 71 of bearing 69, there being a socket in the upper surface of sleeve 74 to receive said projection. Thereafter lower pivot member 67 is properly positioned, and the upwardly extending annular projection 73 fits into a similar socket in the bottom of sleeve 74 of the hinged supporting arm 24^b. A stout pin is inserted from below the bottom of the bolster and extends between heads 69 and 72 completing the pivotal or hinged connection between the swinging supporting arms 24^b and the pivot members 66 and 67. The lower end of pin 75 rests upon a plate 76 secured to the horizontally disposed web portion of spring plank 29, which spring plank extends to and through the truck side frames as in the forms previously described.

The outer end of each supporting arm 24^b extends through the truck side frame 26 and has a swivel bearing 27 formed on its underside, which is received in a socket of a swivel bearing plate 28^a secured to the outer end of the spring plank 29. Sufficient clearance is left between the swivel bearing 27 and the inner walls of the socket of swivel bearing plate 28^a to allow the outer ends of swing arms 24^b to slide within said socket.

Lower pivot member 67 has a central depending center-driving plate 77 which fits within a center-driven plate 78 the relation of these center plates being the equivalent of the center plates shown in the other forms and serving the same functions.

Body bolster I-beams 43 which extend through the center sills are connected to the latter by the upper pivot casting 66 and connection pressings 79 similar to connection pressings 65 shown in Fig. 12, and such center sills are maintained separated by spacers 80 riveted to the webs of each center sill.

While the principal invention is illustrated as applied to a center sill construction comprising spaced rolled members, it is to be understood that it is equally applicable to any suitable type of underframe as, for example, one of the mono-sill type.

What I claim is:

1. In combination in car construction, trucks, car body supports thereon having supporting portions intermediate the interior truck sides adapted to move parallel with a roadbed and an underframe constantly resting on said supports.

2. In combination in car construction, trucks, underframe supports thereon, an underframe and a swivel connection between said trucks and underframe affording no support for the latter, part of the swivel connection means having pivotal relation to said supports.

3. In combination in car construction, trucks, an underframe supported thereby and a plurality of pivotal connections between each truck and said underframe the former having a single axis of oscillation.

4. In combination in car construction, trucks having spring planks, an underframe mounted on inwardly extending normally horizontally oscillatory members of said trucks and a draft connection between said underframe and spring planks.

5. In combination in car construction, trucks, an underframe provided with center sills and pivotal connections between said underframe and trucks outside said center sills.

6. In combination in car construction, an underframe and trucks provided with oscillatory members pivotally connected with said underframe and adapted to support the same.

7. In combination in car construction, an underframe, oscillatory members pivotally connected with said underframe and adapted to support the same.

8. In combination in car construction, an underframe and trucks provided with members oscillatively and slidably mounted in the latter and pivotally connected with and adapted to support said underframe.

9. In a car truck, a resiliently mounted spring plank and rigidly reactive means for supporting a bolster from said spring plank.

10. In combination in car construction, a truck having a resiliently supported spring plank mounted therein, an underframe, a swiveling underframe-non-supporting connection between said underframe and spring plank and underframe supports on said truck in other locations.

11. In combination in car construction, an underframe having a center sill, pivot members having spaced upper and lower portions connected with said sill, trucks each provided with a spring plank and underframe-supporting members pivotally mounted between said upper and lower pivot member portions and on said spring plank.

12. In combination in car construction, an underframe having a center sill, supports secured thereto, trucks provided with spring planks and underframe-sustaining members having swiveling connections with said supports and spring plank and adapted to slide at some of said connections.

13. In combination in car construction, an underframe, pivot supports connected therewith, a truck provided with side frames and a spring plank, and underframe-supporting members pivoted to said supports and having a swiveling connection with said spring plank and being slidable through said side frames.

14. In combination in car construction, an underframe, pivot supports connected therewith, a truck comprising spaced side frames, a spring plank and a support therefor and underframe-supporting members pivotally connected to said pivot supports and having a swiveling connection with said spring plank and being slidable through said side frames.

15. In combination in car construction, an underframe, pivot supports connected therewith, a truck comprising side frames having guide columns, a movable spring plank engaging said columns and truck sustained resilient spring plank supports and underframe-supporting members pivotally connected to said pivot supports and engaging said spring plank.

16. In combination in car construction, an underframe, a truck provided with a resiliently supported spring plank having a swiveling connection with said underframe and underframe-supporting members having a pivotal connection with said underframe and a swiveling and slidable connection with said spring plank.

17. In combination in car construction, an underframe, a truck comprising apertured side frames, a spring plank extending into the side frame apertures, bearing plates containing each a socket, and underframe supporting members having pivotal connection with said underframe and swiveling and slidable connections with the sockets of said bearing plates.

18. In combination in car construction, an underframe, a truck comprising side frames having spaced guide columns, a movable spring plank extending between said guides and bearing plates each having a socket portion lying on said spring plank and portions extending over the sides thereof forming guides adapted to engage said columns and underframe-supporting members pivotally connected to said underframe and coöperating with said bearing plate socket portions.

19. In combination in car construction, a body bolster, a truck, supporting arms having swiveling connections with said truck and body bolster and being provided with sockets intermediate their ends, bearing devices in said sockets and bearing members connected with said body bolster continuously resting upon said bearing devices.

20. In combination in car construction, a body bolster, a truck, supporting arms having swiveling connections with said truck and body bolster and being provided with bearings intermediate their ends, and bearing members connected with said body bolster and in continuous engagement with said first mentioned bearing.

21. In combination in car construction, a body bolster, a truck, supporting arms having pivotal connections with said bolster and swiveling and slidable connections with said truck, car body supports comprising bearing devices and bearing shoes connected to said bolster and in continuous engagement with said bearing devices.

22. In combination in car construction, an underframe comprising a center sill and body bolster, a truck, brackets secured to said sill, links depending from said brackets, a driving member pivotally connected with said links, supporting arms, swiveling connections between the latter and said brackets and driving member and between said arms and said truck, a swiveling connection between said truck and driving member.

23. In combination in car construction, an underframe comprising a center sill and body bolster, a truck, brackets secured to said sill, links depending from said brackets, a driving member pivotally connected with said links, supporting arms, swiveling connections between the latter and said brackets and driving member and between said arms and said truck, a swiveling connection between said truck and driving member, and car body supports between said bolster and supporting arms intermediate the ends of the latter.

24. In combination in car construction, an underframe comprising a center sill and body bolster, a truck having a spring plank, outwardly extending brackets secured to said sill, depending links pivoted thereto, a driving member provided with seats adjacent its opposite ends pivotally connecting said links, supporting arms having swiveling connections with said seats and spring plank, a swiveling connection between the latter and said driving member and coöperating car body supports on said arms and bolster.

25. In combination in car construction, an underframe comprising a center sill and body bolster, a truck, outwardly extending brackets secured to said sill, depending links pivoted thereto, a driving member provided with seats adjacent its opposite ends pivotally connecting said links, supporting arms having swiveling connections with said seats, a swiveling connection between the truck and said driving member, coöperating car body supports on said arms and bolster, and pivotal pins connecting said supporting arms and bolster.

26. In combination in car construction, an underframe comprising a center sill and body bolster, a truck, brackets secured to said sill, a driving member supported from said brackets, supporting arms connected with said truck and driving member, pivot pins projecting into said supporting arms and body bolster, a swiveling connection between said truck and driving member, and coöperating car body supports on said arms and bolster.

27. In combination in car construction, an underframe, a body bolster therein, a bolsterless truck and swing arms coöperating with said truck and body bolster.

28. In combination in car construction, an underframe, a body bolster therein, a bolsterless truck, swing arms coöperating with said truck and body bolster and a swiveling driving connection between said underframe and truck.

29. In combination in car construction, a body bolster and a swiveling bolsterless truck supporting said bolster and interlocked therewith against vertical separation intermediate the side structure and the center of swiveling of the truck.

30. In combination in car construction, a body bolster, a bolsterless truck having a plurality of swiveling connections therewith and car body supports located away from said swiveling connections.

31. In combination in car construction, a car body and a bolsterless truck swivelingly connected therewith and having side frames and truck-carried means intermediate the connection and truck side frames positioned away from the truck side frames and adapted to support the car body.

32. In combination in car construction, an underframe, a bolsterless truck having side frames, cushioning devices supported by said frames, a spring plank supported by said cushioning devices and a swiveling driving connection between said spring plank and underframe.

33. In combination in car construction, an underframe, a bolsterless truck having side frames, cushioning devices supported by said frames, a spring plank, a non-underframe-supporting swiveling driving connection between said spring plank and underframe and car body supports between said truck and underframe away from said swiveling connection.

34. In combination in car construction, a truck, an underframe and means connecting said underframe and truck permitting the latter to swivel, said means having portions interlocking with said underframe and truck preventing the last two mentioned elements from separating from said means irrespective of the position of said underframe.

35. In combination in car construction, trucks, an underframe provided with center sills and pivotal connections between said underframe and trucks extending laterally of said center sills.

36. In a railway car, a truck, an underframe positioned thereabove, interlocking and non-supporting swiveling center bearings one being connected to said truck and another to said underframe, and other swiveling connections between said truck and underframe, one of said center bearings forming part thereof.

37. In combination in a railway car, a center sill and a plurality of laterally extending center sill supporting members pivotally connected with said center sill at locations removed from the longitudinal vertical median plane of the car.

38. In combination in a railway car, a bolster and a plurality of pivotally connected members extending longitudinally thereof and coöperating therewith to serve as a support therefor, some of said members being mounted to move horizontally.

39. In a railway car, an underframe having a center sill and a plurality of transversely extending swiveling supporting members therefor pivotally connected with said underframe intermediate the center sill and the sides of said underframe.

40. In combination in a railway car, an underframe, a truck, a cushioning device mounted thereon, a member supported by said cushioning device, and an underframe-supporting member, having swiveling connections with said member and underframe.

41. In combination in a railway car, an underframe, a truck having a side frame, a cushioning device mounted on said side frame, a member supported upon said cushioning device, and an underframe-supporting member having swiveling connections with said member and underframe.

42. In combination in car construction, a truck comprising opposing side-frames, oscillatory supporting arms supported at said side frames, each extending toward an opposing side frame and of less length than the distance between said frames, an intermediate member pivotally connected to and coupling said oscillatory arms and car underframe bearings mounted in said oscillatory arms intermediate the ends thereof, and a car underframe supported thereby.

43. In combination in car construction, a truck comprising opposing side frames, oscillatory supporting arms projecting outwardly through said frames and inwardly toward an opposing side frame for a distance insufficient for the inner ends of said arms to reach each other, said supporting arms being yieldingly supported at said frames, an intermediate member coupling said supporting arms and having swiveling relation therewith, and car underframe bearings intermediate the ends of said supporting arms and a car underframe supported thereby.

44. In combination in car construction, a truck comprising opposing side frames, oscillatory supporting arms projecting outwardly into said frames and also inwardly therefrom, springs mounted to be supported by said side frames, and affording a resilient support for the outer end portions of said arms which portions are adapted to swivel above said springs, an intermediate member coupling said supporting arms and having swiveling relation therewith, bearings for a car underframe movable with said arms and a car underframe.

45. In combination in car construction, a truck comprising side frames, inwardly extending oscillatory supporting arms swivelingly mounted at said frames, a member coupling said supporting arms and provided with a swivel member, another suitably supported and positioned swivel member adapted to coöperate with the first mentioned swivel member to establish the truck axis of oscillation, car underframe bearings movable with said oscillatory arms and a car underframe.

46. In combination, truck side frames having openings, and a car body bolster member extending into said openings and being supported upon said frames.

47. In combination, truck side frames, a car body bolster member directly supported upon said frames, and separate bearing means movable both with respect to the side frames and bolster member and supporting said bolster member, said last-named means being constructed and arranged to permit rotation of co-acting pairs of truck frames to pivot about a center point intermediate said frames.

48. In combination, truck side frames having apertures therethrough, and a car body bolster member having winged portions extending through said apertures and carried by said side frames.

49. In combination, truck side frames having apertures therethrough, a car body bolster member having winged portions extending through said apertures and carried by said side frames, and means to permit relative movement of said side frames with respect to said winged portions of said bolster member.

50. In combination, truck side frames having apertures therethrough, a car body bolster member having winged portions extending through said apertures and carried by said side frames, and means to permit relative movement of said side frames with respect to said winged portions of said bolster member, said means comprising bearing members.

51. In combination, truck side frames having apertures therethrough, spring members carried by said side frames, supporting plates movably mounted in said apertures upon said springs, and a body bolster member having portions thereof extending through said apertures and supported upon said plate members.

52. In combination, truck side frames having apertures therethrough, spring members carried by said side frames, supporting plates movably mounted in said apertures upon said springs, a body bolster member having portions thereof extending through said apertures and supported upon said plate members, and bearing members located between said plate members and said bolster portion.

53. In combination, truck side frames, a body bolster member directly supported upon and carried by said side frames, and means connecting said side frames to limit the lateral movement of, and receive the side thrust of, said bolster member.

54. In combination, truck side frames having apertures therethrough, and a body bolster having portions extending through said apertures and carried by said frames, said apertures and bolster portion being so constructed and arranged as to permit necessary relative movement of said side frame with respect to said bolster member.

55. In combination, truck side frames having apertures therethrough, and a body bolster member having depending arms, said arms being provided with projecting wings, said wings being inserted through said apertures in said side frames and carried by said side frames.

56. In combination, truck side frames having apertures therethrough, and a body bolster member having depending arms, said arms being provided with projecting wings, said wings being inserted through said apertures in said side frames and carried by said side frames, said bolster arms being located adjacent to, but slightly spaced from, said side frames to permit a slight relative movement with respect to the same.

57. In combination, truck side frames having apertures therethrough, and a body bolster member having depending arms, said arms being provided with projecting wings, said wings being inserted through said apertures in said side frames and carried by said side frames, said bolster arms being located adjacent to, but slightly spaced from said side frames to permit a slight relative movement with respect to the same, said winged portions being constructed smaller than said side frame apertures to permit pivotal movement of said truck frames with respect to said bolster member.

58. In combination, truck side frames having apertures therethrough, spring members carried by said side frames, supporting means movably mounted in said apertures upon said springs, and a body bolster member having portions thereof extending through said apertures and supported upon said means.

59. In combination, truck side frames having apertures therethrough, spring members carried by said side frames, supporting means movably mounted in said apertures upon said springs, a body bolster member having portions thereof extending through said apertures and supported upon said means, and bearing members located between said means and said bolster portion.

60. A railway car body bolster having bifurcated extremities, the lower portions of which are adapted to serve as supports for the rest of the bolster structure and the upper portion of which is adapted to serve as a direct support for longitudinally extending car underframe members.

61. A railway car body bolster having bifurcated extremities, the lower portions of which are adapted to serve as supports for the rest of the bolster structure and its upper portion projects outwardly beyond said lower portions and is adapted to serve as a direct support for longitudinally extending car underframe member.

62. A railway car body bolster having bifurcated extremities, the lower portions of which are adapted to serve as supports for the rest of the bolster structure and its upper portion is adapted to serve as a support for longitudinally extending car underframe members, some of which are in the plane of said upper portion.

63. In combination in a car structure, a bifurcated body bolster having downwardly and outwardly extending lower portions spaced apart and a continuous upper portion and a center sill intersecting said upper portion intermediate said lower portions.

64. In combination in a car structure, a bifurcated body bolster having downwardly and outwardly extending lower portions spaced apart and a continuous upper portion and a center sill connected directly to said upper portion intermediate said lower portions.

65. In a car construction, a center sill, a bifurcated body bolster comprising an upper sill supporting part and lower portions extending outwardly from said sill and being adapted to rest upon a truck frame.

66. In a car construction, a bifurcated body bolster comprising a lower portion adapted to rest on a truck side frame and serve as supporting means and an upper portion, and a center sill extending in the plane of and being connected with said upper portion.

67. In a car construction, bifurcated body bolsters each comprising a rigid upper portion and having lower portions adapted to rest upon a truck side frame and a center sill in the plane of said upper portions, connecting said upper portions and being connected therewith.

68. A body bolster having bifurcated extremities, the lower portions of which are pivoted and adapted to serve as supports for the rest of the bolster structure and having an upper portion which is adapted to serve as a direct support for longitudinally extending car underframe members which are of a depth greater than that of said upper portion.

69. A body bolster having bifurcated extremities, the lower portions of which are adapted to serve as supports for the rest of the bolster structure and in which its upper part projects outwardly beyond said lower extremities and is adapted to serve as a direct support for longitudinally extending car underframe members.

70. A body bolster having bifurcated extremities, the lower portions of which are adapted to serve as supports for the rest of the bolster structure and having an upper member which extends beyond the ends of said lower portions.

71. In combination in a car underframe structure, a pair of bifurcated body bolsters having downwardly and outwardly extending lower portions spaced apart and upper portions, a center sill deeper than said upper portions extending beyond said bolsters at each end of said car underframe.

72. In combination in a car underframe structure, a bifurcated body bolster having downwardly and outwardly extending lower portions spaced apart and an upper portion and a center sill in the plane of and being connected directly to said upper portion intermediate said lower portions.

73. In a car construction, a center sill, a bifurcated body bolster comprising an upper sill supporting part and lower portions extending outwardly from and pivotally connected with said upper part to serve as supports therefor.

74. In a car construction, bifurcated body bolsters comprising a rigid upper portion and spaced and pivoted supporting portions adapted to rest upon a truck side frame, and a center sill in the plane of said upper portion and being connected thereto.

75. In combination, truck side frames, a bifurcated body bolster directly supported upon and carried by said side frames, and means to limit the lateral movement of, and receive the side thrust of, said bolster.

76. In combination, truck side frames, a body bolster directly supported upon and carried by said side frames, and means connecting said side frames and bolster to limit the lateral movement of, and receive the side thrust of, said bolster.

In witness whereof I have hereunto set my hand in the presence of two witnesses.

JOHN M. ROHLFING.

Witnesses:
 OSCAR HOCHBERG,
 JAMES J. COOPER.